United States Patent
Browne et al.

(10) Patent No.: US 6,459,431 B1
(45) Date of Patent: Oct. 1, 2002

(54) METHOD AND APPARATUS FOR ORIENTATING A SET OF FINITE N-DIMENSIONAL SPACE CURVES

(75) Inventors: Cameron Bolitho Browne, Burleigh Heads; Michael Richard Arnold, Surry Hills; Neil Eric Carlyle, Bayview, all of (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/379,730

(22) Filed: Aug. 24, 1999

(30) Foreign Application Priority Data

Aug. 28, 1998 (AU) .............................................. PP 5579

(51) Int. Cl.⁷ .............................................. G06T 17/00
(52) U.S. Cl. ........................ 345/442; 345/441; 345/418; 345/419; 345/467; 345/468; 345/472
(58) Field of Search ................................. 345/441, 442, 345/467, 468, 469, 469.1, 471, 472, 472.1, 472.2, 472.3

(56) References Cited

U.S. PATENT DOCUMENTS

| | | | | |
|---|---|---|---|---|
| 4,298,945 A | * | 11/1981 | Kyte et al. ................... 364/523 |
| 4,660,028 A | * | 4/1987 | Yu ............................... 340/739 |
| 4,748,443 A | * | 5/1988 | Uehara et al. ............... 340/751 |
| 5,384,902 A | | 1/1995 | Carlsen ....................... 395/131 |
| 5,410,645 A | * | 4/1995 | Ooka et al. .................. 395/142 |
| 5,594,855 A | * | 1/1997 | Von Her, II et al. ........ 395/142 |
| 5,771,035 A | | 6/1998 | Imaki et al. ................. 345/143 |
| 5,825,370 A | * | 10/1998 | Yoshida et al. ............. 345/472 |
| 5,850,228 A | * | 12/1998 | Hasegawa et al. .......... 345/471 |
| 5,940,084 A | * | 8/1999 | Motokado et al. .......... 345/468 |
| 5,959,635 A | * | 9/1999 | Watanabe et al. ........... 345/469 |
| 5,977,949 A | * | 11/1999 | Itou et al. .................... 345/142 |
| 6,011,561 A | * | 1/2000 | Shigi et al. .................. 345/471 |
| 6,034,702 A | * | 3/2000 | Yabuuchi et al. ........... 345/471 |
| 6,256,039 B1 | * | 7/2001 | Krishnamurthy ............ 345/420 |

FOREIGN PATENT DOCUMENTS

WO 90/00289 1/1990

* cited by examiner

Primary Examiner—Matthew Luu
Assistant Examiner—Daniel J Chung
(74) Attorney, Agent, or Firm—Fitzpatrick, Cella, Harper & Scinto

(57) ABSTRACT

An undirected graph is generated based on a set of finite n-dimensional space curves. One or more traversal modulations are selected and a directed graph is created by traversing the edges of the undirected graph and determining a direction, either a forward direction or a reverse direction, for each edge in accordance with the selected traversal modulations. The method then re-orientates the set of finite n-dimensional space curves in accordance with the directed graph.

63 Claims, 11 Drawing Sheets

METHOD AND APPARATUS FOR ORIENTATING A SET OF FINITE N-DIMENSIONAL SPACE CURVES

FIELD OF THE INVENTION

The present invention relates to a method and apparatus for orientating a set of finite n-dimensional space curves. The present invention also relates to a method and apparatus for orientating a set of stroke curves of characters. The invention further relates to a computer program product comprising a computer readable medium including a computer program for orientating a set of finite n-dimensional space curves. The invention also relates to a computer program product comprising a computer readable medium including a computer program for orientating a set of stroke curves of characters.

BACKGROUND OF INVENTION

U.S. Pat. No. 5,771,035 discloses a character generation device for producing new fonts from a basic font and paste components. The device has a shape recogniser for extracting an element of a character of the basic font and recognising it's shape. The shape recogniser determines the stroke angle of the element and the paste components are superposed at the angle matching the angle of the stroke. The device allows the easy generation of characters of a font without manually designing each character. However, this device suffers from the disadvantage that it is not possible to manipulate the stored basic font.

SUMMARY OF INVENTION

It is an object of the present invention to ameliorate one or more disadvantages of the prior art.

According to one aspect of the invention there is provided a method of orientating a set of finite n-dimensional space curves, the method comprising the steps of: (i) generating an undirected graph having edges and vertices based upon a set of finite n-dimensional space curves; (ii) determining one or more of said vertices as one or more starting points; (iii) selecting one or more traversal modulations; (iv) traversing the edges of the undirected graph, commencing at said one or more starting points and assigning a direction of each said edge so traversed dependent on one of said one or more traversal modulations so as to form a directed graph; and (v) orientating said set of finite n-dimensional space curves in accordance with said directed graph.

According to another aspect of the invention there is provided apparatus for orientating a set of finite n-dimensional space curves, the apparatus comprising: generation means for generating an undirected graph having edges and vertices based upon a set of finite n-dimensional space curves; determination means for determining one or more of said vertices as one or more starting points; selection means for selecting one or more traversal modulations; traversal means for traversing the edges of the undirected graph, commencing at said one or more starting points and assigning a direction of each said edge so traversed dependent on one of said one or more traversal modulations so as to form a directed graph; and orientation means for orientating said set of finite n-dimensional space curves in accordance with said directed graph.

According to another aspect of the invention there is provided a computer program product comprising a computer readable medium including a computer program for orientating a set of finite n-dimensional space curves, the computer program product comprising: generation means for generating an undirected graph having edges and vertices based upon a set of finite n-dimensional space curves; determination means for determining one or more of said vertices as one or more starting points; selection means for selecting one or more traversal modulations; traversal means for traversing the edges of the undirected graph, commencing at said one or more starting points and assigning a direction of each said edge so traversed dependent on one of said one or more traversal modulations so as to form a directed graph; and orientation means for orientating said set of finite n-dimensional space curves in accordance with said directed graph.

According to another aspect of the invention there is provided a method of orientating a set of stroke curves, the method comprising the steps of: (i) deriving a set of 2-dimensional finite space curves from a set of stroke curves; (ii) generating an undirected graph having edges and vertices based upon said set of finite 2-dimensional space curves; (iii) determining one or more of said vertices as one or more starting points; (iv) selecting one or more traversal modulations; (v) selecting a graph traversal technique; (vi) traversing the edges of the undirected graph in accordance with said selected technique, commencing at said one or more starting points and assigning a direction of each said edge so traversed dependent on one of said one or more traversal modulations so as to form a directed graph; (vii) orientating said set of finite 2-dimensional space curves in accordance with said directed graph; and (viii) orientating a set of stroke curves in accordance with said orientated set of space curves.

According to another aspect of the invention there is provided a method of orientating a set of stroke curves, the method comprising the steps of: (i) deriving a set of 2-dimensional finite space curves from a set of stroke curves; (ii) generating an undirected graph having edges and vertices based upon said derived set of finite 2-dimensional space curves; (iii) determining one or more of said vertices of said undirected graph as one or more starting points; (iv) selecting one or more traversal modulations; (v) traversing the edges of the undirected graph, commencing at said one or more starting points and assigning a direction of each said edge so traversed dependent on one of said one or more traversal modulations so as to form a directed graph; wherein said traversing step (v) comprises the substeps of: (v)(a) setting all said edges as unmarked; (v)(b) traversing an unmarked edge; (v)(c) assigning a said direction of the currently traversed edge based on a phase of the initial vertex of the currently traversed edge and one of said one or more traversal modulations; (v)(d) assigning a phase to the terminating vertex of the currently traversed edge based on a phase of the initial vertex of the currently traversed edge and one of said one or more traversal modulations; (v)(e) marking said currently traversed edge; and (v)(f) repetitively performing substeps (v)(b) to (v)(e), commencing with said one or more starting points, until all edges have been marked;(vi) orientating said set of finite 2-dimensional space curves in accordance with said directed graph; and (vii) orientating a set of stroke curves in accordance with said orientated set of space curves.

According to another aspect of the invention there is provided apparatus for orientating a set of stroke curves, the apparatus comprising: means for deriving a set of 2-dimensional finite space curves from a set of stroke curves; means for generating an undirected graph having edges and vertices based upon said set of finite 2-dimensional space curves; means for determining one or more of said vertices as one or more starting points; means for selecting one or more traversal modulations; means for selecting a graph traversal technique; means for traversing the edges of the undirected graph in accordance with said selected technique, commencing at said one or more starting points and assigning a direction of each said edge so traversed dependent on one of said one or more traversal modulations so as to form a directed graph; means for orientating said set of finite 2-dimensional space curves in accordance with said directed graph; and means for orientating a set of stroke curves in accordance with said orientated set of space curves.

According to another aspect of the invention there is provided apparatus for orientating a set of stroke curves, the apparatus comprising: means for deriving a set of 2-dimensional finite space curves from a set of stroke curves; means for generating an undirected graph having edges and vertices based upon said derived set of finite 2-dimensional space curves; means for determining one or more of said vertices of said undirected graph as one or more starting points; means for selecting one or more traversal modulations; traversal means for traversing the edges of the undirected graph, commencing at said one or more starting points and assigning a direction of each said edge so traversed dependent on one of said one or more traversal modulations so as to form a directed graph; wherein said traversing means comprises: setting means for setting all said edges as unmarked; traversing means for traversing an unmarked edge; first assignation means for assigning a said direction of the currently traversed edge based on a phase of the initial vertex of the currently traversed edge and one of said one or more traversal modulations; second assignation means for assigning a phase to the terminating vertex of the currently traversed edge based on a phase of the initial vertex of the currently traversed edge and one of said one or more traversal modulations; marking means for marking said currently traversed edge; and repetition means for repetiting the operations of the traversing means, first and second assignation means, and marking means, commencing with said one or more starting points, until all edges have been marked; means for orientating said set of finite 2-dimensional space curves in accordance with said directed graph; and means for orientating a set of stroke curves in accordance with said orientated set of space curves.

According to another aspect of the invention there is provided a computer program product comprising a computer readable medium including a computer program for orientating a set of stroke curves, the computer program product comprising: means for deriving a set of 2-dimensional finite space curves from a set of stroke curves; means for generating an undirected graph having edges and vertices based upon said set of finite 2-dimensional space curves; means for determining one or more of said vertices as one or more starting points; means for selecting one or more traversal modulations; means for selecting a graph traversal technique; means for traversing the edges of the undirected graph in accordance with said selected technique, commencing at said one or more starting points and assigning a direction of each said edge so traversed dependent on one of said one or more traversal modulations so as to form a directed graph; means for orientating said set of finite 2-dimensional space curves in accordance with said directed graph; and means for orientating a set of stroke curves in accordance with said orientated set of space curves.

According to another aspect of the invention there is provided a computer program product comprising a computer readable medium including a computer program for orientating a set of stroke curves, the computer program product comprising: means for deriving a set of 2-dimensional finite space curves from a set of stroke curves; means for generating an undirected graph having edges and vertices based upon said derived set of finite 2-dimensional space curves; means for determining one or more of said vertices of said undirected graph as one or more starting points; means for selecting one or more traversal modulations; traversal means for traversing the edges of the undirected graph, commencing at said one or more starting points and assigning a direction of each said edge so traversed dependent on one of said one or more traversal modulations so as to form a directed graph; wherein said traversing means comprises: setting means for setting all said edges as unmarked; traversing means for traversing an unmarked edge; first assignation means for assigning a said direction of the currently traversed edge based on a phase of the initial vertex of the currently traversed edge and one of said one or more traversal modulations; second assignation means for assigning a phase to the terminating vertex of the currently traversed edge based on a phase of the initial vertex of the currently traversed edge and one of said one or more traversal modulations; marking means for marking said currently traversed edge; and repetition means for repetiting the operations of the traversing means, first and second assignation means, and marking means, commencing with said one or more starting points, until all edges have been marked; means for orientating said set of finite 2-dimensional space curves in accordance with said directed graph; and means for orientating a set of stroke curves in accordance with said orientated set of space curves.

BRIEF DESCRIPTION OF THE DRAWINGS

Embodiments of the invention are described with reference to the accompanying drawings, in which.

DETAILED DESCRIPTION

Figure 1:
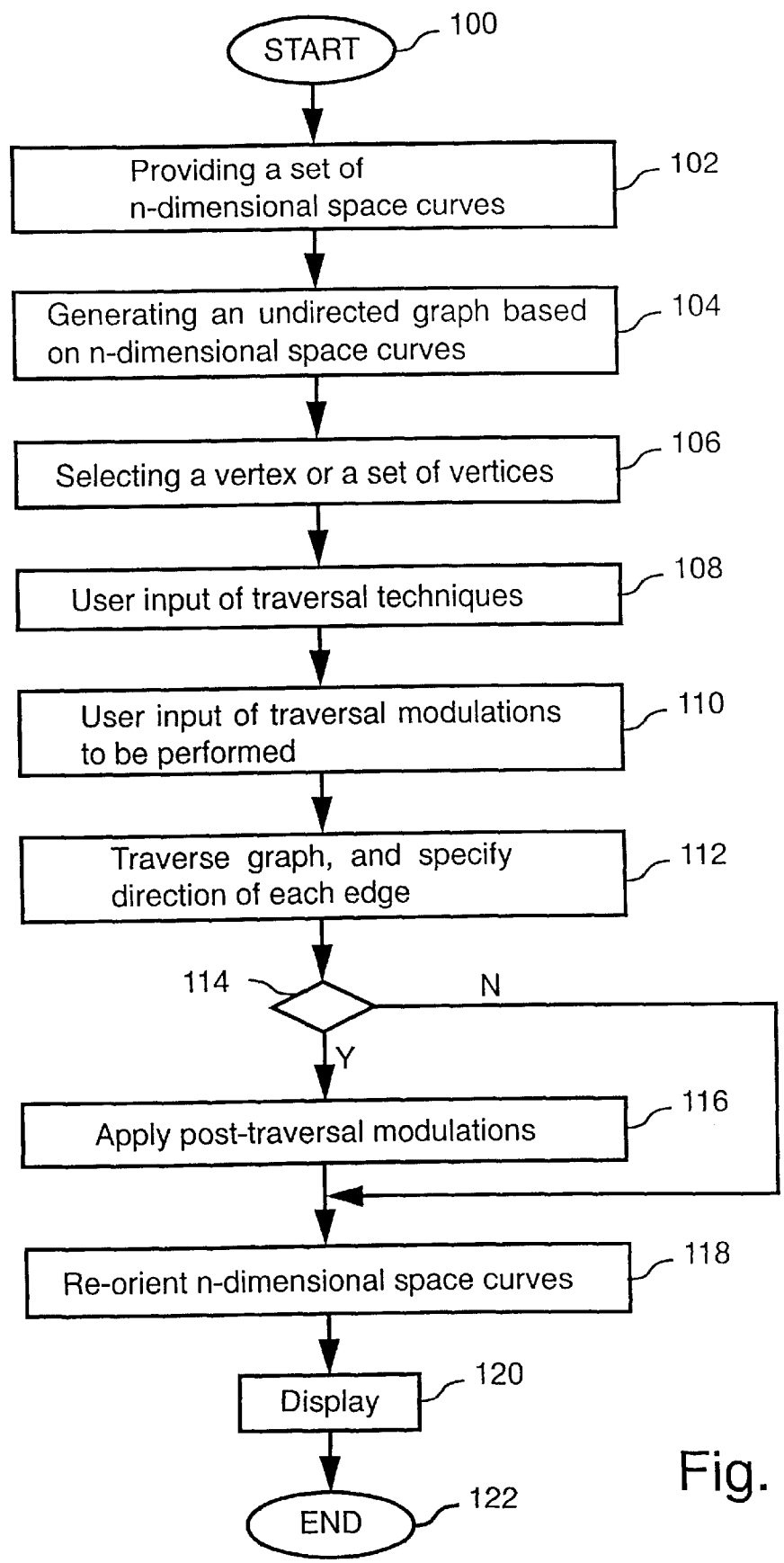
FIG. 1 illustrates a flow diagram of the preferred method for orienting a set of finite n-dimensional space curves.

The principles of the preferred method described herein have general applicability to n-dimensional space curves. However, for ease of explanation, the steps of the preferred method are described with reference to 2-dimensional examples. It is not intended that the present invention be limited to only these 2-dimensional examples.

Some portions of the detailed descriptions which follow are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms, such as space curves, edges, vertices, are to be associated with the appropriate physical quantities and are merely convenient labels applied to these quantities. Unless specifically stated otherwise as apparent from the following discussions, it is appreciated that throughout the present invention, discussions utilizing terms such as "selecting", "determining", "generating", "deriving", "traversing", "orientating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. The algorithms and displays presented herein are not inherently related to any particular computer or other apparatus. Various general-purpose machines may be used with programs in accordance with the teachings herein, or it may prove convenient to construct more specialized apparatus to perform the required method steps. The structure of a conventional general-purpose computer will appear from the description below.

In addition, the present invention also relates to a computer program product comprising a computer readable medium including a computer program for orientating a set of finite n-dimensional space curves. The computer readable medium is taken herein to include any transmission medium for transmitting the computer program between a source and a designation. The transmission medium may include storage devices such as magnetic or optical disks, memory chips, or other storage devices suitable for interfacing with a general purpose computer. The transmission medium may also include a hard-wired medium such as exemplified in the Internet system, or wireless medium such as exemplified in the GSM mobile telephone system. The computer program is not described with reference to any particular programming language and implementation thereof. It will be appreciated that a variety of programming languages and implementations thereof may be used to implement the teachings of the invention as described herein.

FIG. 1 illustrates a flow diagram of the preferred method for orienting a set of finite n-dimensional space curves. The preferred method allows orientation of curves in a consistent manner according to well-defined rules, with the user only providing a limited amount of information. The method commences at step 100 and any necessary processes and parameters are initialised. In the next step 102, a set of n-dimensional space curves are provided.

Figure 3A:
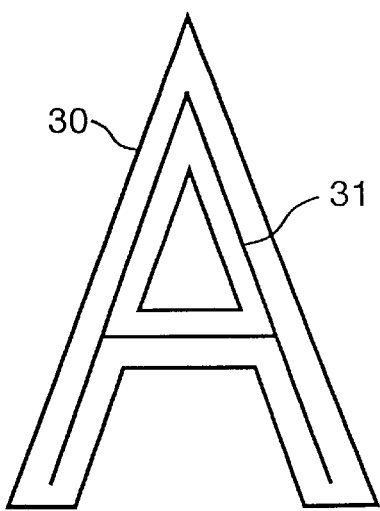
FIG. 3A illustrates a particular shape of the text character "A"

FIG. 3A illustrates an example of a complex character shape "A" suitable for display on a monitor or printing. This text character 30 may be stored in a quadratic B-spline format and accessed from memory for processing by the preferred method. Alternatively, the text character 30 may be implicitly generated. The format of the text character is then preferably converted to a cubic Bezier curves format for ease of processing. A skeleton 31 of the text character 30 is generated which may be utilised as the set of 2-dimensional space curves.

Figure 3B:
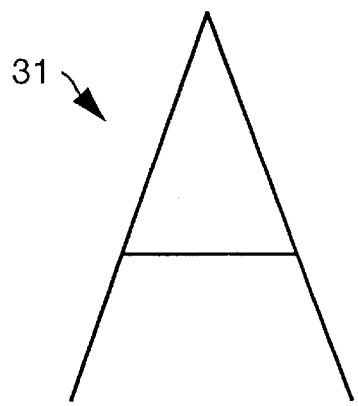
FIG. 3B illustrates the skeleton of the character shown in FIG. 3A.

FIG. 3B illustrates how the skeleton 31 of the text character 30 shown in FIG. 3A is obtained. An algorithm is applied to the character 30 for finding the centre of the strokes to obtain a skeleton 31. Any of the known algorithms for achieving this purpose would be suitable.

In the next step 104 of the method, an undirected graph based on the n-dimensional space curves is generated. The primitive curves and endpoints of the space curves are determined and an undirected graph based on these points and curves is generated.

Figure 3C:
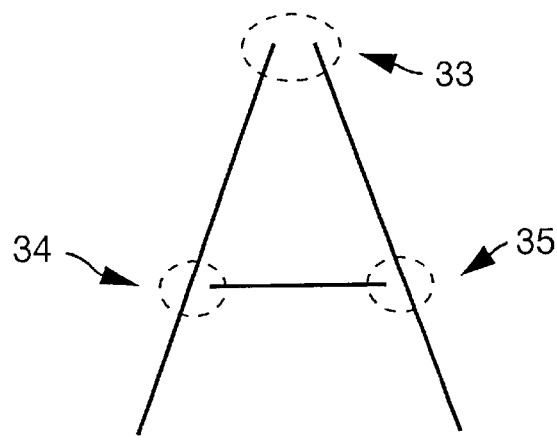
FIG. 3C illustrates the set of space curves of the skeleton shown in FIG. 3B.

FIG. 3C illustrates how stroke sets composed of connected primitive curves 31 may be derived from the skeleton 31. Typically, the curves of the skeleton 31 are divided at points of continuity change, much as an artist drawing the character shape would break their pen/brush stroke at these points. These "break points" 33 are distinct from "junction points" at which stroke ends meet other strokes 34, 35. These points 33,34 and 35 can be algorithmically determined. Again, any of the known algorithms for achieving this purpose would be suitable.

Figure 3D:
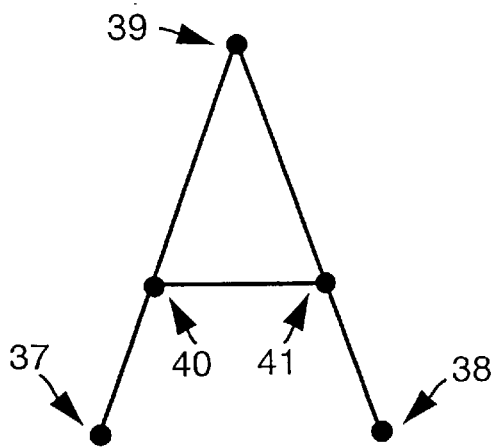
FIG. 3D illustrates the undirected graph representation of FIG. 3B.

FIG. 3D illustrates how these points 33,34 and 35 and curves 32 may be presented as an undirected graph 36. Stroke end points 37 & 38, break point 39, and junction points 40 & 41 define the graph vertices, and the primitive stroke curves define the graph edges. In the case where break points coincide with junction or end points, the point in question will be deemed to be a junction point. Therefore end points can be recognised as graph vertices with cardinality 1, break points can be recognised as graph vertices with cardinality 2, and junction points can be recognised as graph vertices with cardinality greater than 2.

Figure 3E:
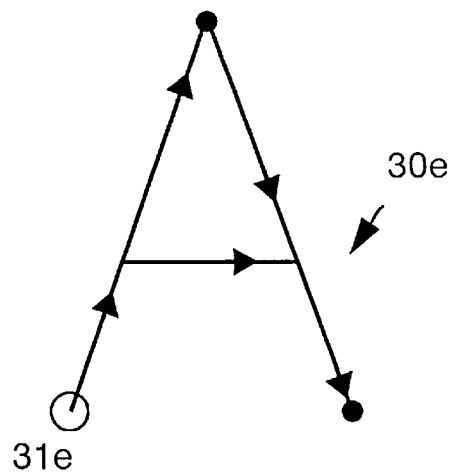
FIG. 3E illustrates a directed graph representation of FIG. 3D as a result of the preferred method.
Figure 3F:
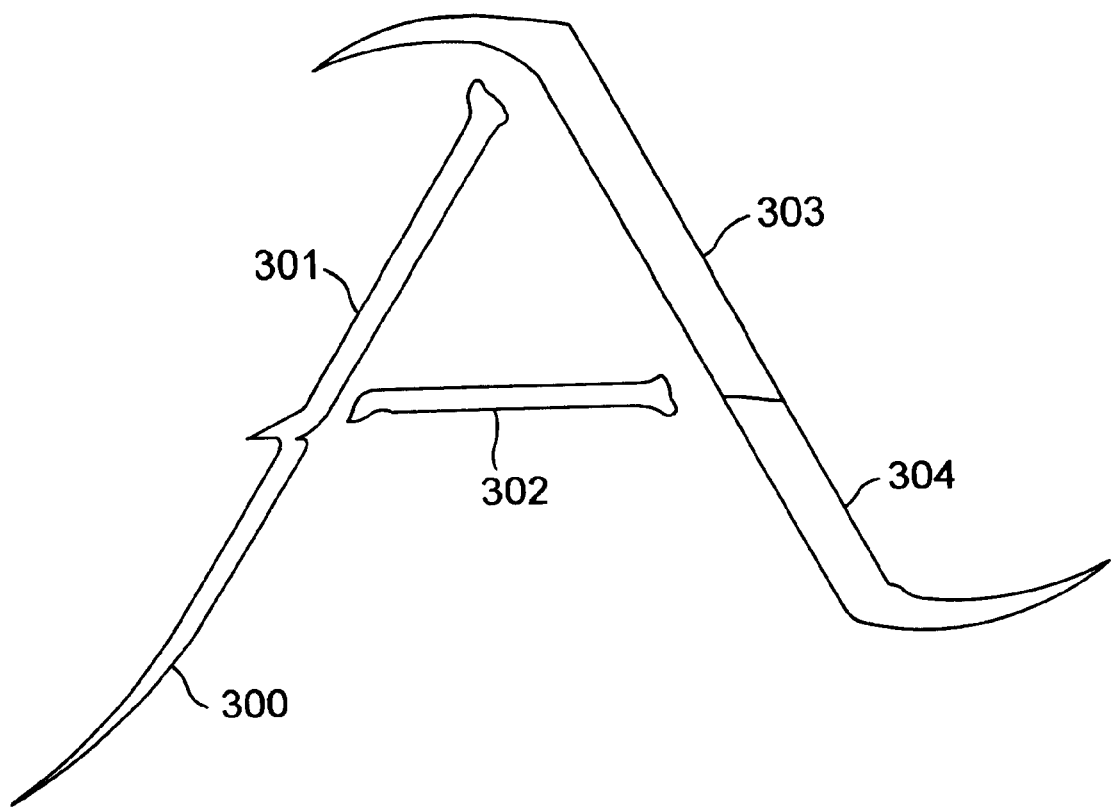
FIG. 3F illustrates an orientated set of curves in accordance with the directed graph of FIG. 3E.

FIG. 3E shows an example of a directed graph representation of FIG. 3D as generated by the preferred method. FIG. 3F shows an example of orientated stroke curves in accordance with the directed graph representation of FIG. 3E. The generation of the directed graph and orientation character stroke examples are discussed in more detail below.

Returning now to FIG. 1, the next step 106 in the preferred method selects a starting point or a set of starting points from which to begin traversal. A number of alternative methods for selecting starting points exist, and comprise:

a) by absolute point position, b) by absolute edge direction, c) by cardinality, d) by time stamp, or e) distance from graph centroid.

This list is not exhaustive and any consistent (and preferably reproducible) method for selecting the set of starting points may be applied.

Figure 4A:
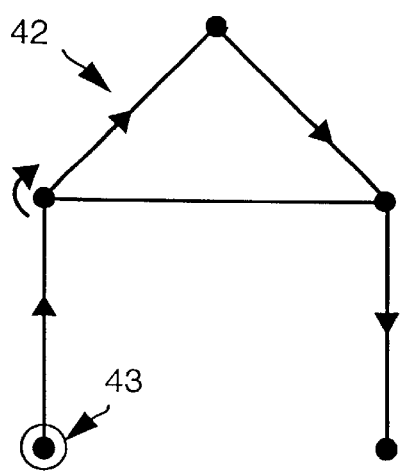
FIGS. 4A and 4B illustrate a step for selecting starting point(s) on a graph based on vertex position.

FIG. 4A illustrates one example of the step for selecting a starting point on a graph based on vertex position. In this example, a single starting point 43 for the graph 42 is chosen by selecting the point with the minimum value y. If there are several points having the same minimum y value, then that point is chosen having the minimum x value from amongst those points having the same minimum y value.

Figure 4B:
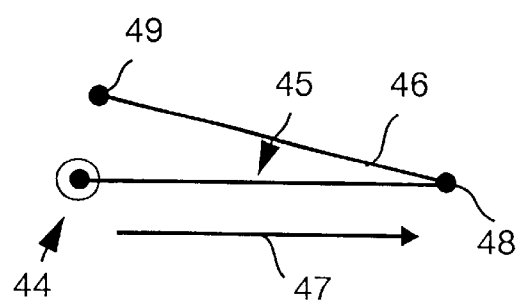

FIG. 4B illustrates one example of the step for selecting starting point(s) on a graph based on edge direction. The starting point(s) are chosen by selecting the point with an edge most closely approximating a given angle. This may be achieved by determining the dot products of a user selected vector v 47 and the edges of the graph 45 and 46 and selecting the edge 45 (and it's starting point 44) which has the maximum dot product. The edges 45 and 46 of the graph are treated as vectors having a direction pointing away from the potential starting points 44, 48 and 49. Where two or more edges and corresponding starting points have the same dot product, then all these can be utilised. For the general n-dimensional case, the selection criteria for the starting points should provide unique solutions in n dimensions.

Figure 5A:
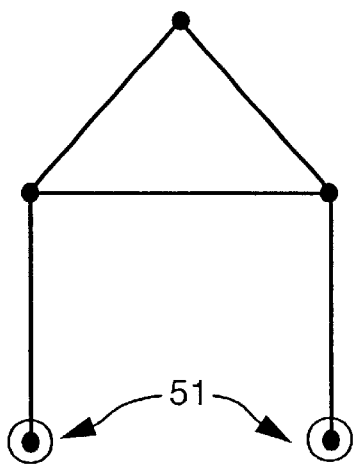
FIGS. 5A to 5D illustrate a step for selecting starting point(s) on a graph based on vertex cardinality.
Figure 5B:
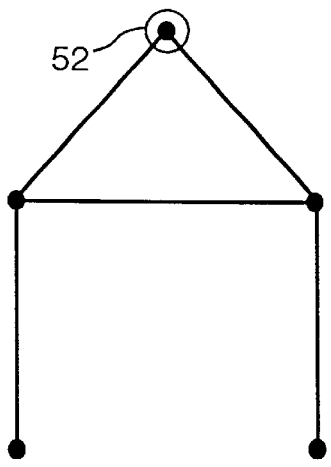
Figure 5C:
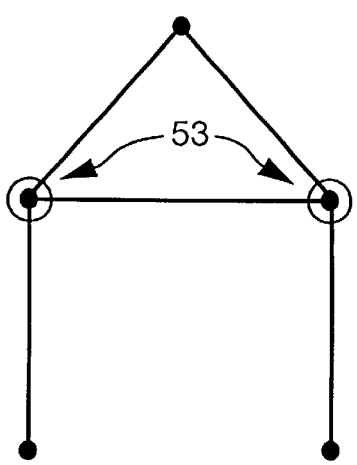
Figure 5D:
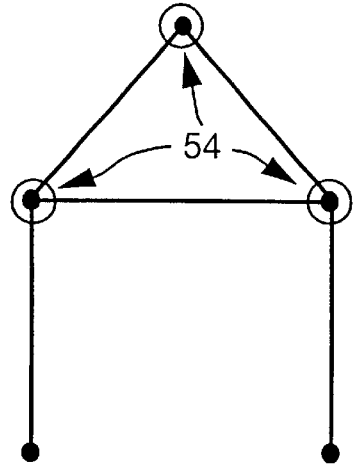

Turning now to FIGS. 5A to 5D, there is shown one example of the step for selecting starting point(s) on a graph based on cardinality. In this example, the members of the starting point set are chosen according to their cardinality (the number of edges with this point as vertex). Good choices for starting set criteria might comprise:

c1) points with cardinality=1 (end points) 51 (FIG. 5A), c2) points with cardinality=2 (break points) 52 (FIG. 5B), c3) points with cardinality>2 (unction points) 53 (FIG. 5C), and c4) points with cardinality>1 (break and junction points) 54 (FIG. 5D).

If the starting point set contains more than one member, then the starting points should be ordered by priority and processed in that order. This ordering might be based on position, direction, time stamp, etc, or some other criteria.

Returning now to FIG. 1. In the next steps 108 and 110 of the preferred method, the user inputs the desired traversal technique and traversal modulations to be performed.

In the next step 112, the edges of the undirected graph are traversed in a consistent manner determined by the user input of step 108. During the traversal the direction of each edge is determined based on the modulation determined by the user input step 110. Initially all edges are marked as "unvisited" and have no direction. The undirected graph is then traversed such that every edge is processed. As each edge is processed it is assigned a direction based on the phase of the point from which it is visited, and the modulations applied. The edge is then marked as "visited". In the absence of modulation, directions are consecutive. To avoid cycles in the graph, edges should be visited only once.

Figure 2:
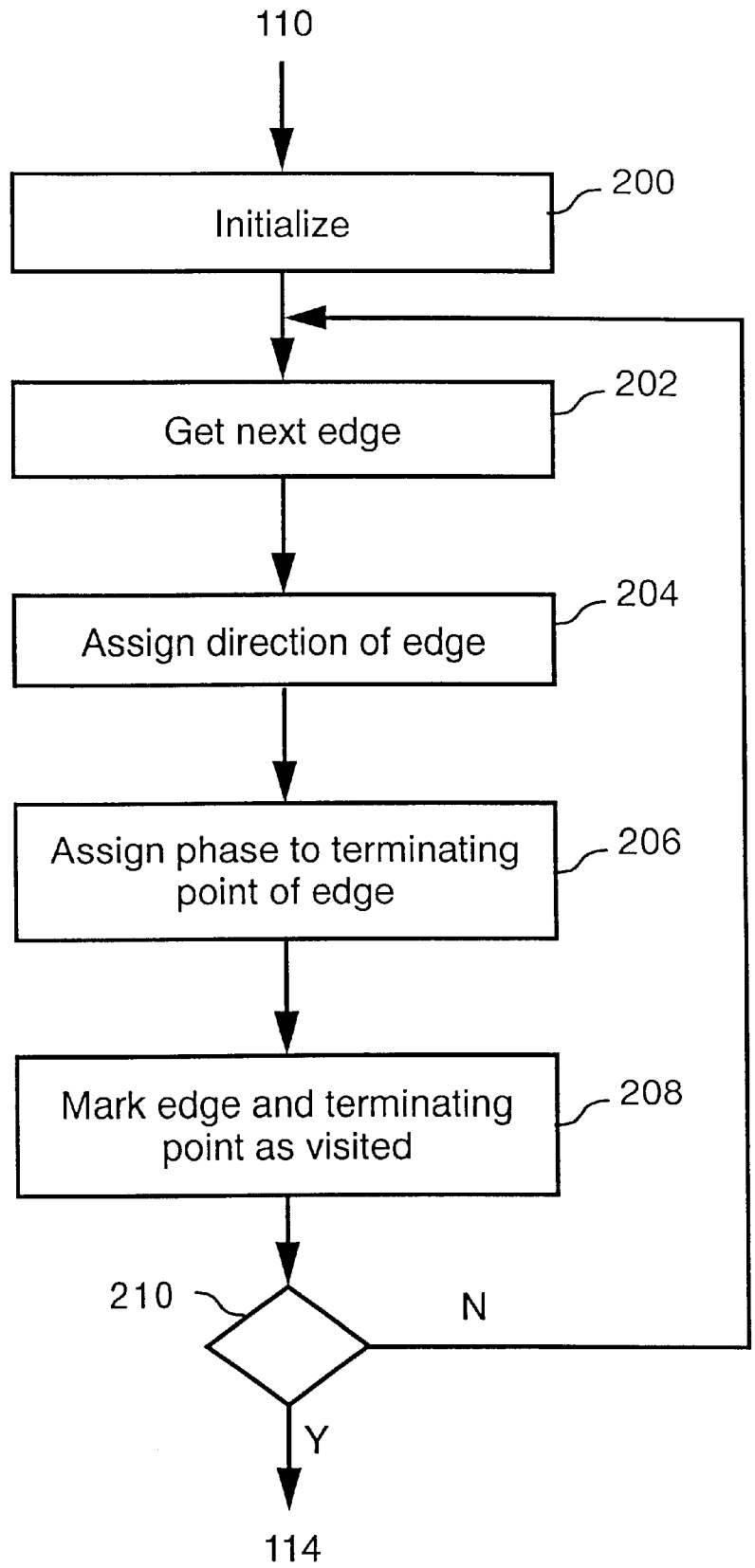
FIG. 2 illustrates a flow diagram of step 112 of FIG. 1 shown in more detail.

FIG. 2 illustrates in more detail the flow diagram of step 112 of FIG. 1. In the initial step 200, all edges are marked as "unvisited" and have no direction. In the next step 202, an edge is traversed according to the graph traversal technique selected by the user in step 110.

Figure 6A:
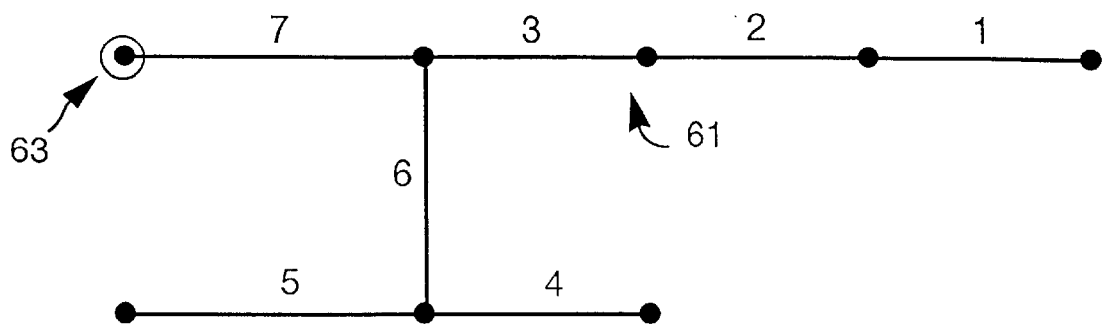
FIGS. 6A and 6B illustrate edge orders resulting from different graph traversal methods.
Figure 6B:
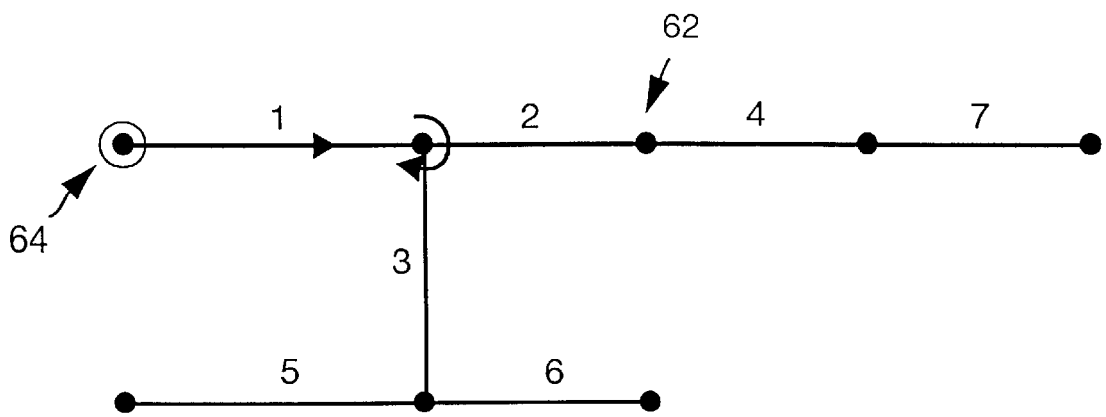

Turning now to FIGS. 6A and 6B, there are shown two methods for graph traversal that produce consistent and distinct results and that may be utilised in step 202. Depth-first traversal 61 visits vertices according to edge distance from the starting point(s) in the order farthest to nearest. Breadth-first traversal 62 visits vertices in order of edge distance from the starting point(s). The order in which edges are visited are marked 1,2,3,4,5,6 and 7. The starting points 63 and 64 are shown for each graph. Where there are a plurality of starting points, all edges that can be traversed from one starting point are first visited, then all edges that can be traversed from the next starting point are visited and so on until all edges have been traversed. In a still further embodiment, all of the starting points are first traversed in a predetermined order, then all remaining edges traversed according to one of the above traversal methods. Such methods, or any consistent (and preferably reproducible) method, may be chosen for graph traversal.

In the next step 204, the current traversed edge is assigned a direction based on the phase of the vertex from which it is visited, and the modulation selected by the user in step 110.

Figure 6C:
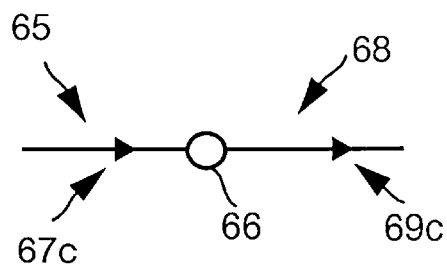
FIGS. 6C and 6D illustrate the implementation of step 204 of FIG. 2.
Figure 6D:
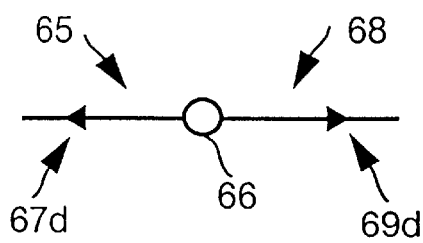
Figure 7A:
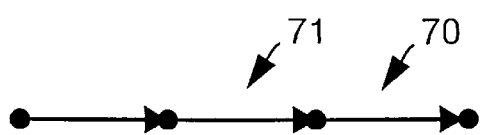
FIGS. 7A to 7D illustrate edge direction modulation by alternating phase.
Figure 7B:
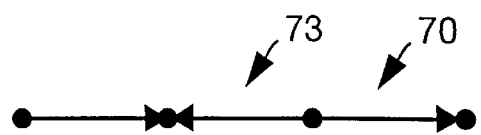
Figure 7C:
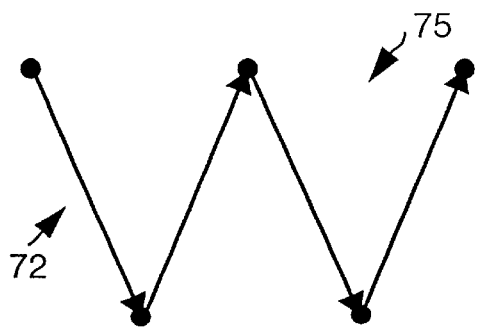
Figure 7D:
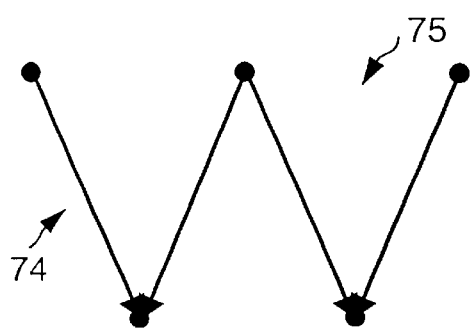
Figure 8A:
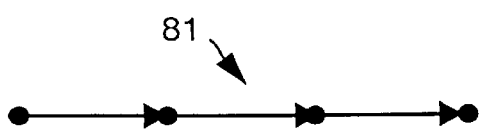
FIGS. 8A to 8D illustrate edge direction modulation by inverting phase.
Figure 8B:
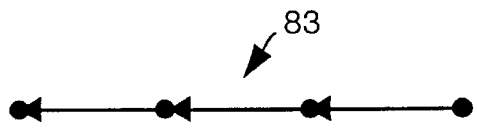
Figure 8C:
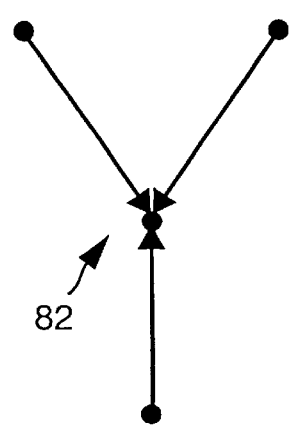
Figure 8D:
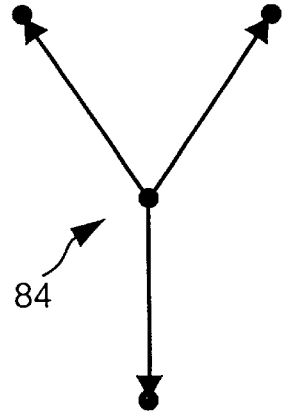

Before proceeding further with a description of the embodiments, a brief review of terminology used herein is provided with reference to the examples shown in FIGS. 6C and 6D. The term "direction" of an edge used herein refers to whether the edge (e.g. 65) is pointing towards (e.g. 67c) the terminating vertex (e.g. 66) called herein the forward direction or away (e.g. 67d) from the terminating vertex (e.g. 66) called herein the reverse direction. The term "traversal modulation" used herein refers to an operation, which operates on a phase of the initial vertex of the currently traversed edge to generate the direction of that currently traversed edge. The term "phase" of a vertex used herein refers to a characterising feature of the vertex, which has one of two states (forward or reverse phase). Generally, the phase of a vertex (e.g. 66) is indicative of whether the previously traversed edge (e.g. 65) is oriented in a direction (e.g. 67c) towards the vertex (e.g. 66), or in the opposite direction (e.g. 67d) away from the vertex (e.g. 66). In the former case the vertex (e.g. 66 FIG. 6C) has forward phase, whereas in the latter case the vertex (e.g. 66 FIG. 6D) has reverse phase. A phase may also be assigned for each starting point. In the example shown in FIG. 6C, the user has selected no traversal modulation (null traversal modulation) to be applied. In these circumstances, the direction of the current traversed edge 68 (FIG. 6C) will take that of the phase of the initial vertex 66 (FIG. 6C), namely the forward direction. In the example shown in FIG. 6D, the user has selected an inverse modulation. The direction of the current traversed edge 69d takes the reverse of the phase of vertex 66 (FIG. 6D), namely the forward direction. The terms "directed graph", "undirected graph", "breadth-first traversal" and "depth-traversal" are used herein in the same context as used in the text "Data Structures and Program Design in C" by R. L. Kruse, B. P. Leung, C. L. Tondo, published by Prentice Hall 1991.

FIGS. 7A to 7D illustrate further modulations that may be applied when deciding edge orientation. Shown are two graphs 70 (FIG. 7A) and 75 (FIG. 7C) oriented in a forward consecutive manner 71 & 72 as a result of a starting point having a forward phase and the application of no (null) modulation. The graphs 73 (FIGS. 7B) and 75 (FIG. 7D) are oriented in an alternating manner as a result of the starting point having a forward phase and an alternating modulation. These modulations may be applied during step 204. Many other types of modulations are possible. Some other examples are reversal (which is described below with reference to FIGS. 8A to 8D), inversion (which is described above with reference to FIG. 6D), forward, double alternating (forward, forward, reverse, reverse) and so on. Preferably, one modulation is selected by the user and is applied consistently throughout the traversal. Alternatively, it is possible to apply different modulations to different starting points. In a still further embodiment, the user can select to apply a local modulation. Namely, the user may select to apply a particular modulation to a specific designated location within the graph.

In the next step 206, the terminating vertex of the current edge is assigned a phase based upon the assigned direction of the current traversed edge. Specifically, if the assigned direction is forward the phase will be assigned as forward. Similarly, if the assigned direction is reverse the phase will be assigned as reverse.

After step 206, the processing continues at step 208 where the current edge is marked as "visited". Preferably once the terminating vertex is assigned a phase, the vertex is also marked as "visited". In this way, only "unvisited" vertices may be assigned a phase and the phase of "visited" vertices may not be reassigned. It will be apparent that step 206 may occur anytime after step 202 and before decision block 210. After step 208, the processing continues at decision block 210.

In the decision block 210, a check is made whether or not all edges of the undirected graph have been traversed. If decision block 210 returns true (yes), nothing is done and processing continues at decision block 114. Otherwise, if decision block 210 returns false (no), processing continues at step 202.

Figure 9:
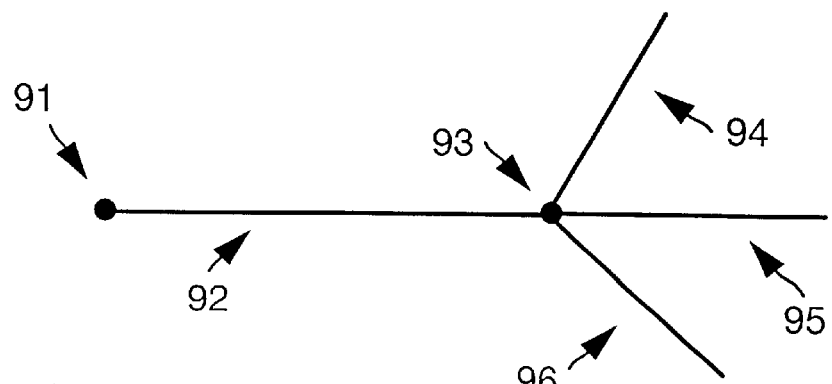
FIG. 9 illustrates a vertex with an incoming visited edge, and several outgoing unvisited edges that must be ordered.

FIG. 9 illustrates an example of the traversal process of FIG. 2. Given a starting point 91 with an associated phase, the direction of edge 92 is determined based on that phase and any current modulations, and edge 92 is marked as "visited". The adjoining vertex 93 is then assigned a phase based upon the phase of vertex 91 and any modulations. Unvisited edges 94, 95 & 96 are then traversed in a consistent order. Additional visited edges are ignored. The ordering of unvisited edges from a vertex may be based on:

a) rotation from visited edge,
b) direction relative to visited edge, or
c) time stamp.

This list is not exhaustive and any consistent (and preferably reproducible) method for ordering unvisited edges from a vertex may be applied. For the general case of n-dimensional curves, the ordering method may have to be modified to produce valid results in n dimensions.

Figure 10:
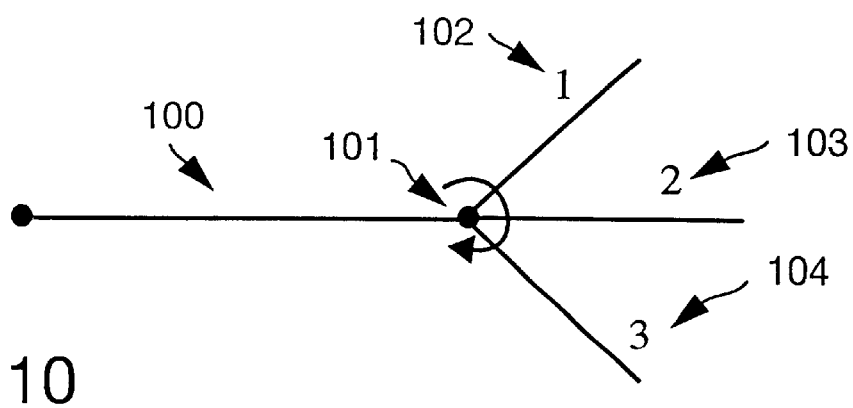
FIG. 10 illustrates the ordering of unvisited edges based on rotation from the visited edge.

Turning now to FIG. 10, there is shown the abovementioned method (a) where unvisited edges are ordered by rotation from the visited edge 100. Rotating about vertex 101 in a clockwise direction, the unvisited edges are encountered in the order 102, 103 then 104, which becomes the traversal order 1,2 and 3 for those edges. The anticlockwise is direction could be chosen if preferred.

Figure 11:
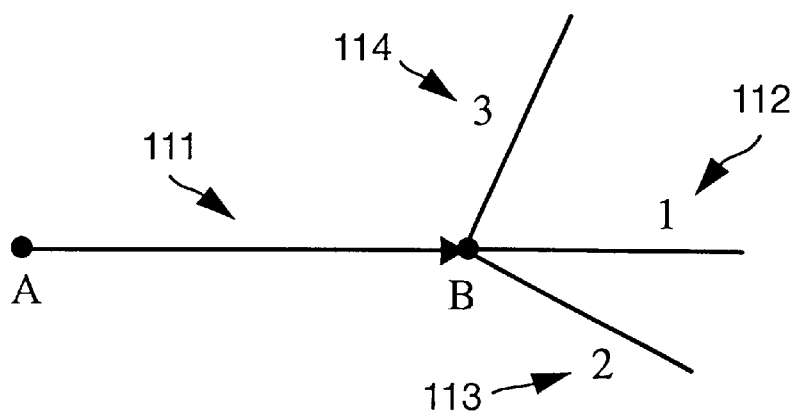
FIG. 11 illustrates the ordering of unvisited edges based on direction relative to visited edge.

FIG. 11 illustrates the abovementioned method (b) where unvisited edges are ordered according to how closely their outward directions match the inward direction of the vector AB formed by the incoming visited edge 111. In this case, it can be seen that the direction unvisited edge 112 most closely matches this direction, so it is given highest priority. The remaining unvisited edges are prioritised in the order 113 then 114 based on their outward direction. The traversal order 1,2 and 3 for those edges are 112, 113 & 114. If two unvisited edges are equally matched in terms of their direction relative to the incoming visited edge, then some consistent mechanism should be used to resolve this deadlock, for instance always choose the left or right alternative.

Returning now to the method shown in FIG. 1. After step 112, the processing continues at decision block 114. In the decision block 114, a check is made whether or not any post traversal modulation is desired by the user. If decision block 114 returns no (false), nothing is done and processing continues at step 118. Otherwise, if decision block 114 returns yes (true), processing continues at step 116. In step 116, the desired post traversal modulation is applied to the directed graph.

FIGS. 8A to 8D illustrate a possible post traversal modulation that may be applied in step 116, after edge orientations have been decided. Directed graphs 81 & 82 may have their edges reoriented in the opposite direction 83 & 84 (phase reversal modulation). This modulation is applied after the graph has been converted to a directed graph following the graph traversal step. Alternatively, this modulation may be applied as each edge direction is decided during the graph traversal step.

On the completion of step 112 or step 116, all edges have been visited and oriented in the desired manner, resulting in a directed graph.

FIG. 3E shows an example of a directed graph generated from the text character shown in FIG. 3A. The directed graph 30e is generated by implementing the preferred method, wherein the starting point 31e is selected by position, i.e. the bottom left hand vertex, the phase of the starting point is default i.e. forward phase, the traversal is breadth first and the modulation selected is null (no) modulation. In this way, the directed graph of the text character A may be represented by the undirected graph such as shown in FIG. 3D and the following information; starting point= bottom left hand vertex, phase=forward, traversal=breadth first and modulation=null modulation.

In the next step 118 of the preferred method, the n-dimensional space curves are re-oriented, if necessary, in accordance with the directed graph. The direction of the space curves now have an orientation the same as the corresponding edges of the directed curve. Finally in step 120, the original stroke curves oriented according to the directed space curves may be displayed and/or printed. Alternatively, other stroke curves may be selected and oriented according to the directed space curves.

FIG. 3F shows an example of stroke curves, other than the original stroke curves FIG. 3A, orientated in accordance with the directed graph of FIG. 3E. These stroke curves are in the form of bones consisting of segments 300, 301, 302, 303, and 304 orientated according to the directed graph of FIG. 3E.

If the set of curves to be oriented is already in an oriented format (that is, it occupies a monotonically increasing interval) then for each curve either:

a) the original direction can be retained, or b) the curve must be reoriented, depending on the outcome of the orientation algorithm. If the curve is to be reoriented, this can in general be achieved by relabelling the end points, reversing or reparameterising the curve along its interval, or performing whatever action is relevant to the curve's specific format.

EXAMPLES

Figure 12:
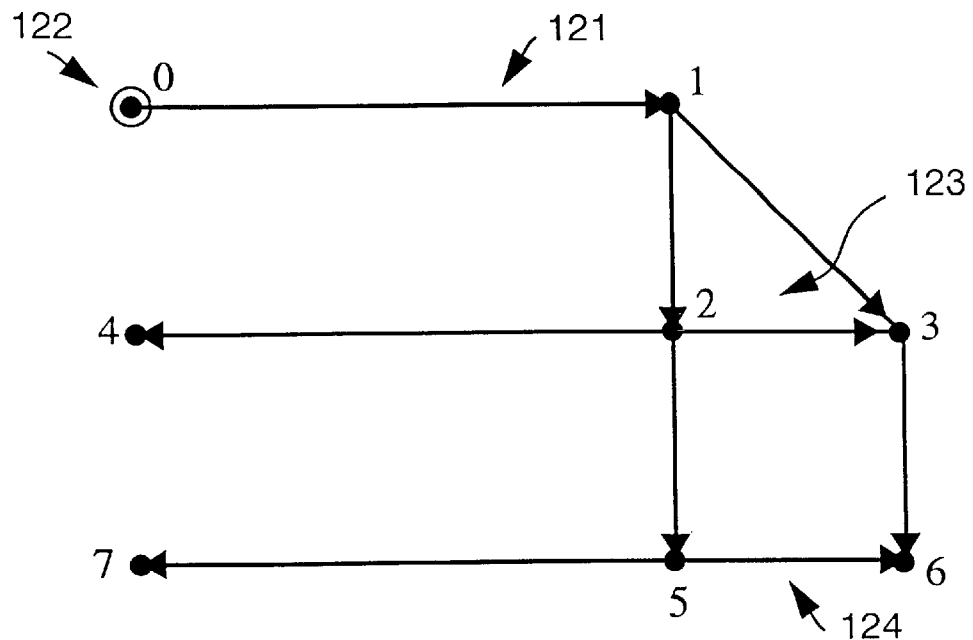
FIG. 12 illustrates a sample 2-dimensional graph directed according to a certain parameter set.

By way of example, FIG. 12 illustrates a 2-dimensional directed graph 121 with edges directed according to the following parameters: start point set=topmost and left most vertex 122, phase of starting point=forward, traversal= breadth first, no (Null) modulation. This graph contains potentially ambiguous edges 123 & 124 whose directions are determined by (i) the order in which the graph is traversed, and (ii) the ordering of unvisited edges at each vertex. The order in which the vertices are visited is labelled as 0,1,2,3,4,5,6 and 7. Note that for these parameters, edges are oriented from lower-numbered vertices towards higher-numbered vertices.

Figure 13:
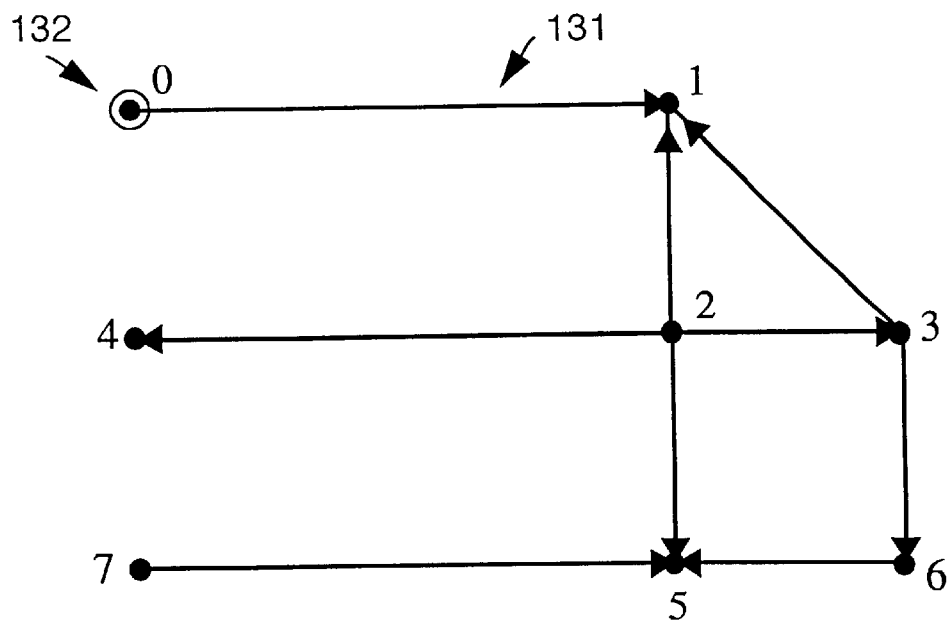
FIG. 13 illustrates a sample 2-dimensional graph directed according to a certain parameter set.

Referring to FIG. 13, there is shown an example 2-dimensional directed graph 131 with edges directed according to the following parameters: start point set= topmost and left most vertex 132, phase of starting point= forward, traversal=breadth first, modulation=alternative. The order in which the vertices are visited is labelled as 0,1,2,3,4,5,6 and 7.

Figure 14:
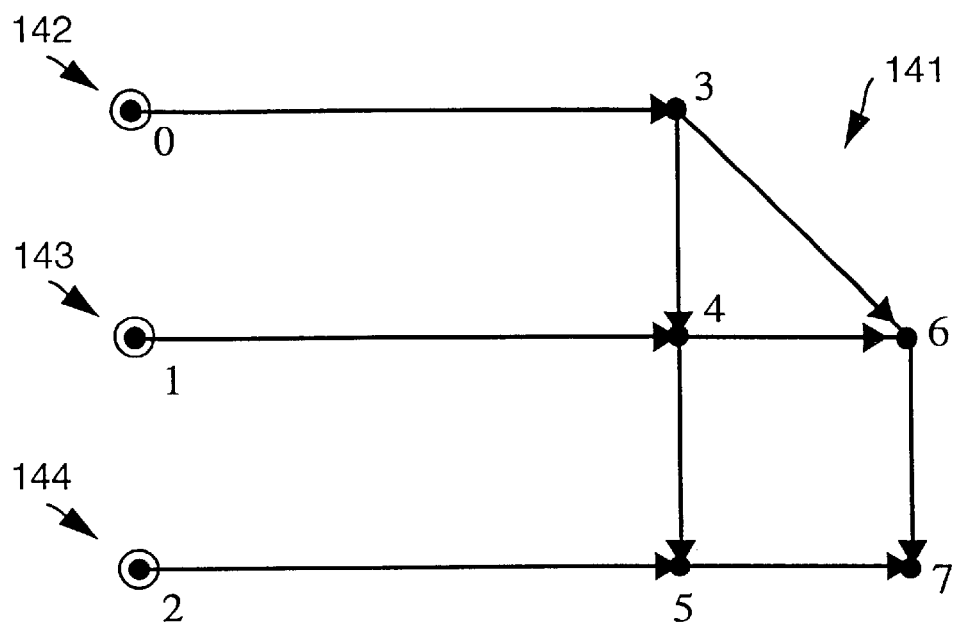
FIG. 14 illustrates a sample 2-dimensional graph directed according to a certain parameter set.

FIG. 14 illustrates an example 2-dimensional directed graph 141 with edges directed according to the following parameters: start point set=points with cardinality of 1 (142, 143 & 144), phase of starting points=forward, traversal= breadth first, no (Null) modulation. The order in which the vertices are visited is labelled as 0,1,2,3,4,5,6 and 7.

Figure 15:
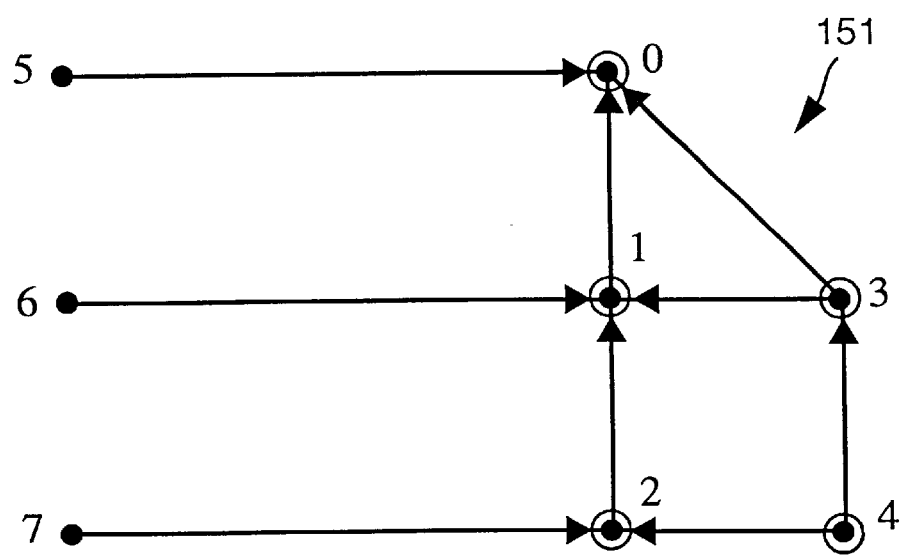
FIG. 15 illustrates a sample 2-dimensional graph directed according to a certain parameter set.

FIG. 15 illustrates an example 2-dimensional directed graph 151 with edges directed according to the following parameters: start point set=points with cardinality>1, phase of starting points=forward, traversal=breadth first, modulation=reversal. The order in which the vertices are visited is labelled as 0,1,2,3,4,5,6 and 7. In this case a majority of vertices are nominated as starting points, which fully determines the order in which vertices are visited, essentially overriding the traversal order.

PREFERRED EMBODIMENT OF APPARATUS(S)

Figure 16:
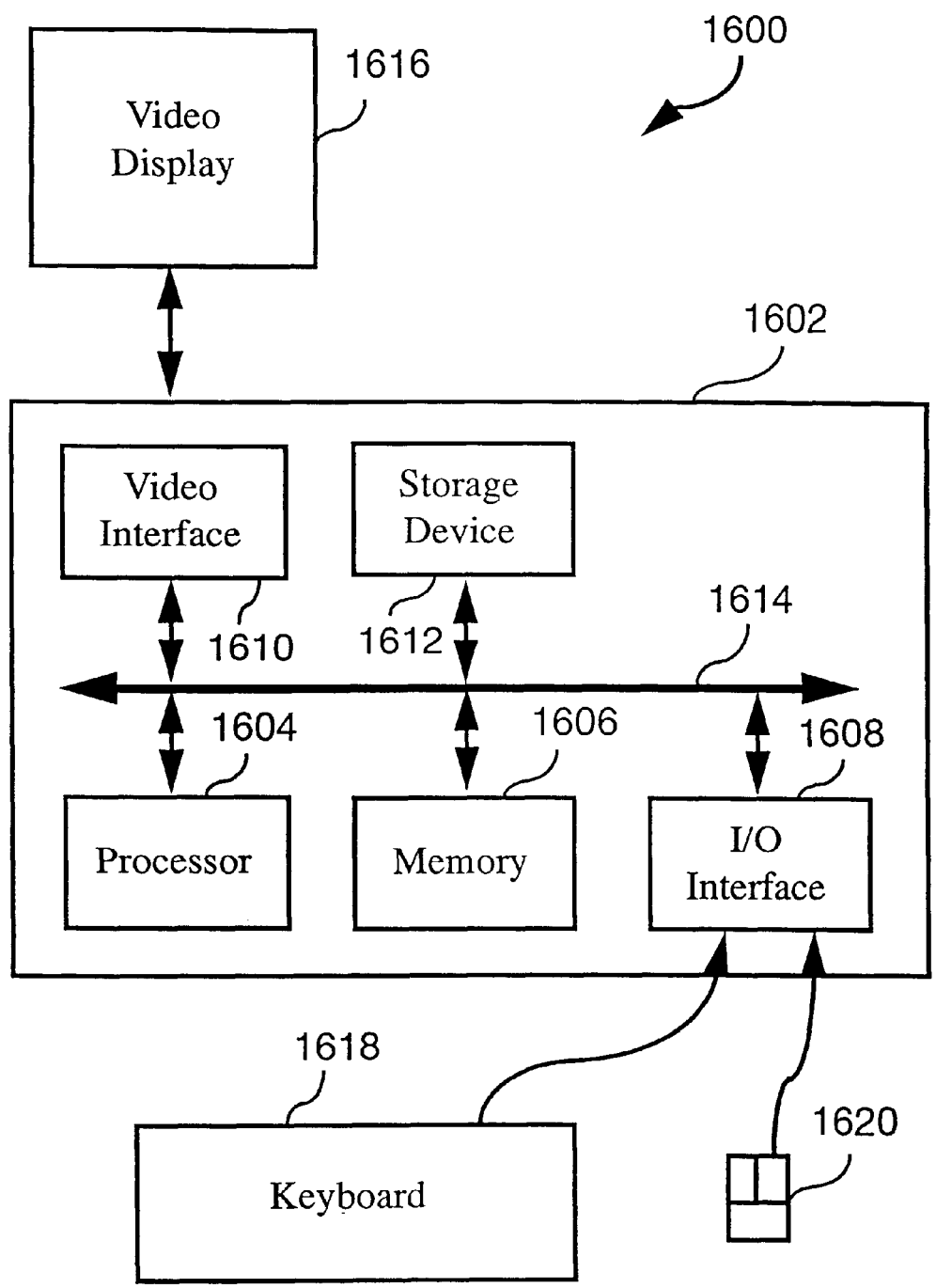
FIG. 16 is a block diagram of a general purpose computer with which the embodiments can be implemented.

The preferred method is preferably practiced using a conventional general-purpose computer, such as the one shown in FIG. 16, wherein the processes of FIGS. 1 and 2 may be implemented as software executing on the computer. In particular, the steps of the preferred methods are effected by instructions in the software that are carried out by the computer. The software may be divided into two separate parts; one part for carrying out the method of orienting of a set of finite n-dimensional space curves; and another part to manage the user interface between the latter and the user. The software may be stored in a computer readable medium, comprising the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for orienting a set of finite n-dimensional space curves in accordance with the embodiments of the invention.

The computer system 1600 consists of the computer 1602, a video display 1616, and input devices 1618, 1620. In addition, the computer system 1600 can have any of a number of other output devices comprising line printers, laser printers, plotters, and other reproduction devices connected to the computer 1602. The computer system 1600 can be connected to one or more other computers via a communication interface using an appropriate communication channel such as a modem communications path, a computer network, or the like. The computer network may comprise a local area network (LAN), a wide area network (WAN), an Intranet, and/or the Internet The computer 1602 itself consists of a central processing unit(s) (simply referred to as a processor hereinafter) 1604, a memory 1606 which may comprise random access memory (RAM) and read-only memory (ROM), input/output (IO) interfaces, a video interface 1610, and one or more storage devices generally represented by a block 1612 in FIG. 16. The storage device(s) 1612 can consist of one or more of the following: a floppy disc, a hard disc drive, a magneto-optical disc drive, CD-ROM, magnetic tape or any other of a number of non-volatile storage devices well known to those skilled in the art. Each of the components 1604 to 1612 is typically connected to one or more of the other devices via a bus 1614 that in turn can consist of data, address, and control buses.

The video interface 1610 is connected to the video display 1616 and provides video signals from the computer 1602 for display on the video display 1616. User input to operate the computer 1602 can be provided by one or more input devices. For example, an operator can use the keyboard 1618 and/or a pointing device such as the mouse 1620 to provide input to the computer 1602.

The system 1600 is simply provided for illustrative purposes and other configurations can be employed without departing from the scope and spirit of the invention. Exemplary computers on which the embodiment can be practiced comprise IBM-PC/ATs or compatibles, one of the Macintosh™ family of PCs, Sun Sparcstation™, or the like. The foregoing are merely exemplary of the types of computers with which the embodiments of the invention may be practiced. Typically, the processes of the embodiments, described hereinafter, are resident as software or a program recorded on a hard disk drive (generally depicted as block 1612 in FIG. 16) as the computer readable medium, and read and controlled using the processor 1604. Intermediate storage of the program and pixel data and any data fetched from the network may be accomplished using the semiconductor memory 1606, possibly in concert with the hard disk drive 1612.

In some instances, the program may be supplied to the user encoded on a CD-ROM or a floppy disk (both generally depicted by block 1612), or alternatively could be read by the user from the network via a modem device connected to the computer, for example. Still further, the software can also be loaded into the computer system 1600 from other computer readable medium comprising magnetic tape, a ROM or integrated circuit, a magneto-optical disk, a radio or infra-red transmission channel between the computer and another device, a computer readable card such as a PCMCIA card, and the Internet and Intranets comprising email transmissions and information recorded on websites and the like. The foregoing are merely exemplary of relevant computer readable mediums. Other computer readable mediums may be practiced without departing from the scope and spirit of the invention.

APPLICATIONS

The preferred embodiment has many areas of application and a number of examples follow but are not seen as exhaustive. Such applications comprise, artistic tools for generating stroke based fonts, tools for calligraphic applications, and the generation of artistic effects on objects described by arbitrary space curves. The preferred method has special application in the area of calligraphy, where incorrectly oriented strokes are easily recognised and indicative of poor technique. The preferred method may be used to strictly enforce stroke orientation rules intuitively used by artists in the creation of calligraphic designs or similar decorative curve-based artwork.

The foregoing only describes a small number of embodiments of the present invention, however, modifications and/or changes can be made thereto by a person skilled in the art without departing from the scope and spirit of the invention.

We claim:

1. A method for re-orientating a set of one or more finite n-dimensional space curves, said method comprising the steps of:

generating an undirected graph having edges and vertices based upon the set of one or more finite n-dimensional space curves;

determining one or more of the vertices of the undirected graph as one or more starting points;

selecting one or more traversal modulations, wherein each of the traversal modulations is an operator for performing an operation on an edge of the undirected graph to determine a direction of the edge, where the direction of the edge is either a forward direction from an initial vertex of the edge to a terminating vertex of the edge or a reverse direction from the terminating vertex of the edge to the initial vertex of the edge;

traversing the edges of the undirected graph, commencing at the one or more starting points determined in said determining step, and performing for each traversed edge one of the selected one or more traversal modulations to determine the direction of the traversed edge and assigning the determined direction to the traversed edge so as to form a directed graph; and re-orientating the set of one or more finite n-dimensional space curves in accordance with the directed graph.

2. A method as claimed in claim 1, wherein each of the traversal modulations is an operator for performing an operation on a phase of an initial vertex of an edge of the undirected graph to determine the direction of the edge, and wherein said traversing step comprises the substeps of:

setting all the edges of the undirected graph as unmarked;

traversing one of the edges set as unmarked;

performing for the traversed edge one of the selected one or more traversal modulations on the phase of the initial vertex of the traversed edge to determine the direction of the traversed edge and assigning the determined direction to the traversed edge;

assigning the determined direction of the traversed edge as the phase of the terminating vertex of the traversed edge;

marking the traversed edge; and repeating said traversing substep, said performing substep, said assigning substep and said marking substep, commencing with the determined one or more starting points, until all the edges of the undirected graph have been marked.

3. A method as claimed in claim 2, wherein said setting substep of said traversing step further comprises setting all the vertices of the undirected graph as unmarked, and said marking substep of said traversing step further comprises marking the terminating vertex of the traversed edge.

4. A method as claimed in claim 1, wherein said method further comprises the step of selecting a graph traversal technique, and wherein said traversing step comprises traversing the edges of the undirected graph in accordance with the selected graph traversal technique.

5. A method as claimed in claim 4, wherein the selected graph traversal technique is a breadth first traversal technique which visits vertices of the undirected graph in order of edge distance from the determined one or more starting points.

6. A method as claimed in claim 4, wherein the selected graph traversal technique is a depth first traversal technique which visits vertices according to an edge distance from the determined one or more starting points in an order from farthest to nearest.

7. A method as claimed in claim 1, wherein different selected traversal modulations are applied to different determined starting points.

8. A method as claimed in claim 1, where one of the one or more traversal modulations is applied locally to a selected vertex of the undirected graph.

9. A method as claimed in claim 1, further comprising the step of applying one or more traversal modulations to the directed graph.

10. A method as claimed in claim 1, wherein said determining step comprises determining the one or more starting points in accordance with a predetermined manner.

11. A method as claimed in claim 1, wherein said determining step further comprises the substep of ordering the determined one or more starting points in a predetermined manner; and said traversing step further comprises commencing at the determined one or more starting points in accordance with the predetermined order.

12. A method as claimed in claim 1, wherein the edges of the undirected graph having a common vertex are traversed in a predetermined manner.

13. A method as claimed in claim 1, wherein said method further comprises the step of re-orientating a set of one or more stroke curves in accordance with the re-orientated set of one or more finite n-dimensional space curves.

14. A method as claimed in claim 1, said method further comprising deriving the set of finite n-dimensional space curves from a set of stroke curves.

15. A method as claimed in claim 1, wherein the finite n-dimensional space curves are 2-dimensional space curves.

16. A method as claimed in claim 15, wherein the set of one or more finite n-dimensional space curves are derived from a set of stroke curves of a text character.

17. A method as claimed in claim 1, wherein the re-orientated set of one or more finite n-dimensional space curves are displayed and/or printed.

18. A method as claimed in claim 13, wherein the re-orientated set of one or more stroke curves are displayed and/or printed.

19. A method as claimed in claim 4, wherein the one or more starting points, the one or more traversal modulations and the graph traversal technique are selected in a predetermined manner.

20. An apparatus for re-orientating a set of one or more finite n-dimensional space curves, said apparatus comprising:

generation means for generating an undirected graph having edges and vertices based upon the set of one or more finite n-dimensional space curves;

determination means for determining one or more of the vertices of the undirected graph as one or more starting points;

selection means for selecting one or more traversal modulations, wherein each of the traversal modulations is an operator for performing an operation on an edge of the undirected graph to determine a direction of the edge, where the direction of the edge is either a forward direction from an initial vertex of the edge to a terminating vertex of the edge or a reverse direction from the terminating vertex of the edge to the initial vertex of the edge;

traversal means for traversing the edges of the undirected graph, commencing at the one or more starting points determined by said determining means, and performing for each traversed edge one of the selected one or more traversal modulations to determine the direction of the traversed edge and assigning the determined direction of the traversed edge so as to form a directed graph; and re-orientation means for re-orienting the set of one or more finite n-dimensional space curves in accordance with the directed graph.

21. An apparatus as claimed in claim 20, wherein each of the one or more traversal modulations is an operator for performing an operation on a phase of an initial vertex of an edge to determine the direction of the edge, and wherein said traversal means comprises:

setting means for setting all the edges of the undirected graph as unmarked;

traversing means for traversing one of the edges set as unmarked;

processing means for performing for the traversed edge one of the selected one or more traversal modulations on the phase of the initial vertex of the traversed edge to determine the direction of the traversed edge and assigning the determined direction to the traversed edge;

assignation means for assigning the determined direction of the traversed edge as the phase of the terminating vertex of the traversed edge;

marking means for marking the traversed edge; and repetition means for repeating the operations of said traversing means, said processing means, said assignation means and said marking means, commencing with the determined one or more starting points, until all the edges of the undirected graph have been marked.

22. An apparatus as claimed in claim 21, wherein said setting means of said traversal means further comprises means for setting all the vertices of the undirected graph as unmarked, and said marking means of said traversal means further comprises vertex marking means for marking the terminating vertex of the traversed edge.

23. An apparatus as claimed in claim 20, wherein said apparatus further comprises selection means for selecting a graph traversal technique, and wherein said traversal means traverses the edges of the undirected graph in accordance with the selected graph traversal technique.

24. An apparatus as claimed in claim 23, wherein the selected graph traversal technique is a breadth first traversal technique which visits vertices of the undirected graph in order of edge distance from the determined one or more starting points.

25. An apparatus as claimed in claim 23, wherein the selected graph traversal technique is a depth first traversal technique which visits vertices of the undirected graph according to an edge distance from the determined one or more starting points in an order from farthest to nearest.

26. An apparatus as claimed in claim 20, wherein different selected traversal modulations are applied to different determined starting points.

27. An apparatus as claimed in claim 20, where one of the one or more traversal modulations is applied locally to a selected vertex of the undirected graph.

28. An apparatus as claimed in claim 20, further comprising applying means for applying one or more traversal modulations to the directed graph.

29. An apparatus as claimed in claim 20, wherein said determination means determines the one or more starting points in accordance with a predetermined manner.

30. An apparatus as claimed in claim 20, wherein said determination means further comprises ordering means for ordering the determined one or more starting points in a predetermined manner, and wherein said traversal means commences traversing at the determined one or more starting points in accordance with the predetermined order.

31. An apparatus as claimed in claim 20, wherein the edges of the undirected graph having a common vertex are traversed in a predetermined manner.

32. An apparatus as claimed in claim 20, wherein said apparatus further comprises second re-orientation means for re-orientating a set of one or more stroke curves in accordance with the re-orientated set of one or more finite n-dimensional space curves.

33. An apparatus as claimed in claim 20, wherein said apparatus further comprises deriving means for deriving the set of finite n-dimensional space curves from a set of stroke curves.

34. An apparatus as claimed in claim 20, wherein the finite n-dimensional space curves are 2-dimensional space curves.

35. An apparatus as claimed in claim 34, wherein the set of one or more finite n-dimensional space curves are derived from a set of stroke curves of a text character.

36. An apparatus as claimed in claim 20, wherein the re-orientated set of one or more finite n-dimensional space curves are displayed and/or printed.

37. An apparatus as claimed in claim 32, wherein the re-orientated set of one or more stroke curves are displayed and/or printed.

38. An apparatus as claimed in claim 23, wherein the one or more starting points, the one or more traversal modulations and the graph traversal technique are selected in a predetermined manner.

39. A computer program product comprising a computer readable medium including a computer program for re-orientating a set of one or more finite n-dimensional space curves, said computer program product comprising:

generation means for generating an undirected graph having edges and vertices based upon the set of one or more finite n-dimensional space curves;

determination means for determining one or more of the vertices of the undirected graph as one or more starting points;

selection means for selecting one or more traversal modulations, wherein each of the traversal modulations is an operator for performing an operation on an edge of the undirected graph to determine a direction of the edge, where the direction of the edge is either a forward direction from an initial vertex of the edge to a terminating vertex of the edge or a reverse direction from the terminating vertex of the edge to the initial vertex of the edge;

traversal means for traversing the edges of the undirected graph, commencing at the one or more starting points determined by said determining means, and performing for each traversed edge one of the selected one or more traversal modulations to determine the direction of the traversed edge and assigning the determined direction to the traversed edge so as to form a directed graph; and re-orientation means for re-orientating the set of one or more finite n-dimensional space curves in accordance with the directed graph.

40. A computer program product as claimed in claim 39, wherein each of the one or more traversal modulations is an operator for performing an operation on a phase of an initial vertex of an edge to determine the direction of the edge, and wherein said traversal means comprises:

setting means for setting all the edges of the undirected graph as unmarked;

traversing means for traversing one of the edges set as unmarked;

processing means for performing for the traversed edge one of the selected one or more traversal modulations on the phase of the initial vertex of the traversed edge to determine the direction of the traversed edge and assigning the determined direction to the traversed edge;

assignation means for assigning the determined direction of the traversed edge as the phase of the terminating vertex of the traversed edge;

marking means for marking the traversed edge; and repetition means for repeating the operations of said traversing means, said processing means, said assignation means and said marking means, commencing with the determined one or more starting points, until all the edges of the undirected graph have been marked.

41. A computer program product as claimed in claim 40, wherein said setting means of said traversal means further comprises means for setting all the vertices of the undirected graph as unmarked, and said marking means of said traversal means further comprises vertex marking means for marking the terminating vertex of the traversed edge.

42. A computer program product as claimed in claim 39, wherein said computer program product further comprises selection means for selecting a graph traversal technique, and wherein said traversal means traverses the edges of the undirected graph in accordance with the selected graph traversal technique.

43. A computer program product as claimed in claim 42, wherein the selected graph traversal technique is a breadth first traversal technique which visits vertices of the undirected graph in order of edge distance from the determined one or more starting points.

44. A computer program product as claimed in claim 42, wherein the selected graph traversal technique is a depth first traversal technique which visits vertices of the undirected graph according to an edge distance from the determined one or more starting points in an order from farthest to nearest.

45. A computer program product as claimed in claim 39, wherein different selected traversal modulations are applied to different determined starting points.

46. A computer program product as claimed in claim 39, where one of the one or more traversal modulations is applied locally to a selected vertex of the undirected graph.

47. A computer program product as claimed in claim 39, further comprising applying means for applying one or more traversal modulations to the directed graph.

48. A computer program product as claimed in claim 39, wherein said determination means determines the one or more starting points in accordance with a predetermined manner.

49. A computer program product as claimed in claim 39, wherein said determination means further comprises ordering means for ordering the determined one or more starting points in a predetermined manner, and wherein said traversal means commences traversing at the one or more starting points in accordance with the predetermined order.

50. A computer program product as claimed in claim 39, wherein the edges of the undirected graph having a common vertex are traversed in a predetermined manner.

51. A computer program product as claimed in claim 39, wherein said computer program product further comprises second re-orientation means for re-orientating a set of one or more stroke curves in accordance with the re-orientated set of one or more finite n-dimensional space curves.

52. A computer program product as claimed in claim 39, wherein said computer program product further comprises deriving means for deriving the set of finite n-dimensional space curves from a set of stroke curves.

53. A computer program product as claimed in claim 39, wherein the finite n-dimensional space curves are 2-dimensional space curves.

54. A computer program product as claimed in claim 53, wherein the set of one or more finite n-dimensional space curves are derived from a set of stroke curves of a text character.

55. A computer program product as claimed in claim 39, wherein the re-orientated set of finite n-dimensional space curves are displayed and/or printed.

56. A computer program product as claimed in claim 51, wherein the re-orientated set of one or more stroke curves are displayed and/or printed.

57. A computer program product as claimed in claim 42, wherein the one or more starting points, the one or more traversal modulations and the graph traversal technique are selected in a predetermined manner.

58. A method of re-orientating a set of one or more stroke curves, the method comprising the steps of:

deriving a set of one or more finite 2-dimensional space curves from the set of one or more stroke curves;

generating an undirected graph having edges and vertices based upon the set of one or more finite 2-dimensional space curves;

determining one or more of the vertices of the undirected graph as one or more starting points;

selecting one or more traversal modulations, wherein each of the one or more traversal modulations is an operator for performing an operation on an edge of the undirected graph to determine a direction of the edge, where the direction of the edge is either a forward direction from an initial vertex of the edge to a terminating vertex of the edge or a reverse direction from the terminating vertex of the edge to the initial vertex of the edge;

selecting a graph traversal technique;

traversing the edges of the undirected graph in accordance with the selected graph traversal technique, commencing at the one or more starting points determined in said determining step, and performing for each traversed edge one of the selected one or more traversal modulations to determine the direction of the traversed edge and assigning the determined direction to the traversed edge so as to form a directed graph;

re-orientating the set of one or more finite 2-dimensional space curves in accordance with the directed graph; and re-orientating the set of one or more stroke curves in accordance with the re-orientated set of one or more finite 2-dimensional space curves.

59. A method of re-orientating a set of one or more stroke curves, said method comprising the steps of:

deriving a set of one or more finite 2-dimensional finite space curves from the set of one or more stroke curves;

generating an undirected graph having edges and vertices based upon the derived set of one or more finite 2-dimensional space curves;

determining one or more of the vertices of the undirected graph as one or more starting points;

selecting one or more traversal modulations, wherein each of the one or more traversal modulations is an operator for performing an operation on an edge of the undirected graph to determine a direction of the edge, where the direction of the edge is either a forward direction from an initial vertex of the edge to a terminating vertex of the edge or a reverse direction from the terminating vertex of the edge to the initial vertex of the edge;

traversing the edges of the undirected graph, commencing at the one or more starting points determined in said determining step and assigning a direction to each traversed edge so as to form a directed graph, wherein said traversing step comprises the substeps of:

- setting all the edges of the undirected graph as unmarked;
- traversing one of the edges set as unmarked;
- performing for the traversed edge one of the selected one or more traversal modulations on a phase of the initial vertex of the traversed edge to determine the direction of the traversed edge and assigning the determined direction to the traversed edge;
- assigning the determined direction of the traversed edge as the phase of the terminating vertex of the traversed edge;
- marking the traversed edge; and
- repeating said traversing substep, said performing substep, said assigning substep and said marking substep, commencing with the determined one or more starting points, until all the edges of the undirected graph have been marked;

re-orientating the set of one or more finite 2-dimensional space curves in accordance with the directed graph; and re-orientating the set of one or more stroke curves in accordance with the re-orientated set of one or more finite 2-dimensional space curves.

60. An apparatus for re-orientating a set of one or more stroke curves, the apparatus comprising:

deriving means for deriving a set of one or more finite 2-dimensional space curves from the set of one or more stroke curves;

generating means for generating an undirected graph having edges and vertices based upon the set of one or more finite 2-dimensional space curves;

determining means for determining one or more of the vertices of the undirected graph as one or more starting points;

first selection means for selecting one or more traversal modulations, wherein each of the one or more traversal modulations is an operator for performing an operation on an edge of the undirected graph to determine a direction of the edge, where the direction of the edge is either a forward direction from an initial vertex of the edge to a terminating vertex of the edge or a reverse direction from the terminating vertex of the edge to the initial vertex of the edge;

second selecting means for selecting a graph traversal technique;

traversal means for traversing the edges of the undirected graph in accordance with the selected graph traversal technique, commencing at the one or more starting points determined by said determining means, and performing for each traversed edge one of the selected one or more traversal modulations to determine the direction of the traversed edge and assigning the determined direction to the traversed edge so as to form a directed graph;

first re-orientation means for re-orientating the set of one or more finite 2-dimensional space curves in accordance with the directed graph; and second re-orientation means for re-orientating the set of one or more stroke curves in accordance with the re-orientated set of one or more finite 2-dimensional space curves.

61. An apparatus for re-orientating a set of one or more stroke curves, the apparatus comprising:

deriving means for deriving a set of one or more finite 2-dimensional space curves from the set of one or more stroke curves;

generating means for generating an undirected graph having edges and vertices based upon the derived set of one or more finite 2-dimensional space curves;

determining means for determining one or more of the vertices of the undirected graph as one or more starting points;

selection means for selecting one or more traversal modulations, wherein each of the one or more traversal modulations is a operator for performing an operation on an edge of the undirected graph to determine a direction of the edge, where the direction of edge is either a forward direction from an initial vertex of the edge to a terminating vertex of the edge or a reverse direction from the terminating vertex of the edge to the initial vertex of the edge;

traversal means for traversing the edges of the undirected graph, commencing at the one or more starting points determined by said determining means, and assigning a direction to each traversed edge so as to form a directed graph, wherein said traversing means comprises:

- setting means for setting all the edges of the undirected graph as unmarked;
- traversing means for traversing one of the edges set as unmarked;
- processing means for performing for the traversed edge one of the selected one or more traversal modulations on a phase of the initial vertex of the traversed edge to determine the direction of the traversed edge and assigning the determined direction to the traversed edge;
- assignation means for assigning the determined direction of the traversed edge as the phase of the terminating vertex of the traversed edge;
- marking means for marking the traversed edge; and
- repetition means for repeating the operations of said traversing means, said processing means, said assignation means and said marking means, commencing with the determined one or more starting points, until all the edges of the undirected graph have been marked;

first re-orientation means for re-orientating the set of one or more finite 2-dimensional space curves in accordance with the directed graph; and second re-orientation means for re-orientating the set of one or more stroke curves in accordance with the re-orientated set of one or more space curves.

62. A computer program product comprising a computer readable medium including a computer program for re-orientating a set of stroke curves, the computer program product comprising:

deriving means for deriving a set of one or more finite 2-dimensional space curves from the set of one or more stroke curves;

generating means for generating an undirected graph having edges and vertices based upon the set of one or more finite 2-dimensional space curves;

determining means for determining one or more of the vertices of the undirected graph as one or more starting points;

first selection means for selecting one or more traversal modulations, wherein each of the one or more traversal modulations is an operator for performing an operation on an edge of the undirected graph to determine a direction of the edge, where the direction of the edge is either a forward direction from an initial vertex of the edge to a terminating vertex of the edge or a reverse direction from the terminating vertex of the edge to the initial vertex of the edge;

second selection means for selecting a graph traversal technique;

traversal means for traversing the edges of the undirected graph in accordance with the selected graph traversal technique, commencing at the determined one or more starting points, and performing for each traversed edge one of the selected one or more traversal modulations to determine the direction of the traversed edge and assigning the determined direction to the traversed edge so as to form a directed graph;

first re-orientation means for re-orientating the set of one or more finite 2-dimensional space curves in accordance with the directed graph; and second re-orientation means for re-orientating the set of one or more stroke curves in accordance with the re-orientated set of one or more finite 2-dimensional space curves.

63. A computer program product comprising a computer readable medium including a computer program for re-orientating a set of one or more stroke curves, the computer program product comprising:

deriving means for deriving a set of one or more finite 2-dimensional space curves from the set of one or more stroke curves;

generating means for generating an undirected graph having edges and vertices based upon the derived set of one or more finite 2-dimensional space curves;

determining means for determining one or more of the vertices of the undirected graph as one or more starting points;

selection means for selecting one or more traversal modulations, wherein each of the one or more traversal modulations is an operator for performing an operation on an edge of the undirected graph to determine a direction of the edge, where the direction of the edge is either a forward direction from an initial vertex of the edge to a terminating vertex of the edge or a reverse direction from the terminating vertex of the edge to the initial vertex of the edge;

traversal means for traversing the edges of the undirected graph, commencing at the determined one or more starting points, and assigning a direction to each traversed edge so as to form a directed graph, wherein said traversing means comprises:

setting means for setting all the edges of the undirected graph as unmarked;

traversing means for traversing one of the edges set as unmarked;

processing means for performing for the traversed edge one of the selected one or more traversal modulations on a phase of the initial vertex of the traversed edge to determine the direction of the traversed edge and assigning the determined direction to the traversed edge;

assignation means for assigning the determined direction of the traversed edge as the phase of the terminating vertex of the traversed edge;

marking means for marking the traversed edge; and repetition means for repeating the operations of said traversing means, said processing means, said assignation means and said marking means, commencing with the determined one or more starting points, until all the edges of the undirected graph have been marked;

first re-orientating means for re-orientating the set of one or more finite 2-dimensional space curves in accordance with the directed graph; and second re-orientating means for re-orientating the set of one or more stroke curves in accordance with the re-orientated set of one or more finite 2-dimensional space curves.

* * * * *